United States Patent
Kulkarni et al.

(10) Patent No.: US 9,720,783 B1
(45) Date of Patent: Aug. 1, 2017

(54) EVENT DRIVEN BACKUPS IN VIRTUALIZED ENVIRONMENTS

(71) Applicant: EMC Corporation, Hopkinton, MA (US)

(72) Inventors: Gururaj Kulkarni, Bangalore (IN); Rakesh Kumar, Bangalore (IN); Harish Jayaram, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 348 days.

(21) Appl. No.: 14/325,977

(22) Filed: Jul. 8, 2014

(51) Int. Cl.
*G06F 11/14* (2006.01)
*G06F 12/00* (2006.01)

(52) U.S. Cl.
CPC ................ *G06F 11/1461* (2013.01)

(58) Field of Classification Search
CPC ............ G06F 11/1446; G06F 11/1448; G06F 11/1451; G06F 11/1453; G06F 11/1456

USPC ................. 711/100, 154, 162, 163
See application file for complete search history.

(56) References Cited

U.S. PATENT DOCUMENTS

| | | | | |
|---|---|---|---|---|
| 7,330,997 B1 * | 2/2008 | Odom | ................. | G06F 11/1464 711/162 |
| 8,433,863 B1 * | 4/2013 | Orcutt | ................. | G06F 11/1458 707/646 |
| 2011/0196840 A1 * | 8/2011 | Barzilai | .............. | G06F 11/1458 707/645 |

* cited by examiner

*Primary Examiner* — Tuan Thai
(74) *Attorney, Agent, or Firm* — Workman Nydegger

(57) ABSTRACT

Systems and methods are provided for performing a backup operation in a computing environment. In an environment that includes virtual machines, a backup policy is established. The policy includes events that includes a control change rate. The events are used to drive the backup operation by causing virtual machines whose change rates satisfy the control change rate. Other virtual machines that do not satisfy the events may be omitted from the backup operation.

13 Claims, 4 Drawing Sheets

EVENT DRIVEN BACKUPS IN VIRTUALIZED ENVIRONMENTS

FIELD OF THE INVENTION

Embodiments of the present invention generally relate to backup operations and restore operations. More particularly, embodiments of the invention relate to event driven backup systems and methods for backing up and/or restoring data such as virtual machines.

BACKGROUND

One of the primary components of many computer systems is the backup system. The backup system is tasked with ensuring that data can be restored with minimal, if any, data loss. As technology and computing systems continue to evolve, the task of backing up the data must also evolve.

Many computing systems, for example, are changing or moving to virtualization and backup systems are attempting to adapt. However, the complexity of backing up virtualized data or virtualized systems can be influenced by many factors. The factors include the hardware on which the data is stored, network speeds and configurations, data locations, computer configurations, virtual components and implementation, size of the computing environment, scalability, or the like.

For example, many computer environments implement a large number of virtual machines. Data centers, for instance, may have a large number of virtual machines (e.g., thousands). Backing up the virtual machines in such environments can require significant computing resources. When a backup operation is initiated, the virtual machines are backed up—even when some of the virtual machines have not experienced any change or have experienced minimal change. This consumes computing resources and may consume network bandwidth unnecessarily.

Systems and methods are therefore needed that allow a backup system to intelligently backup data or to intelligently backup computing systems that include virtualized components such as virtual machines.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
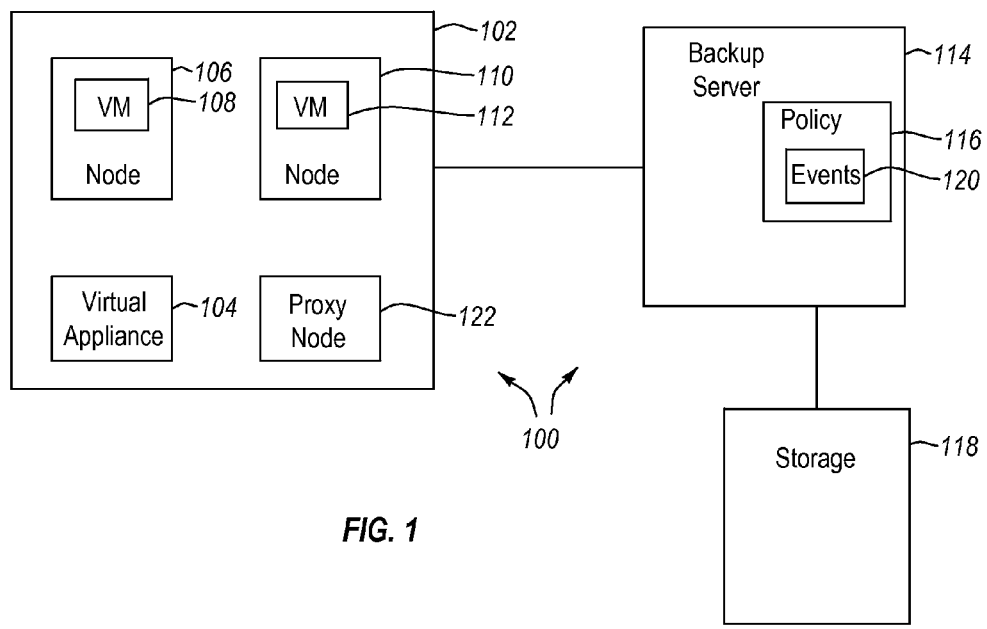
FIG. 1 illustrates an example of a computing environment that includes an example of an event driven backup system.

Embodiments of the invention generally relate to systems and methods for performing data protection operations such as backup operations in a computing environment. Embodiments of the invention further relate to systems and methods for backing up virtual machines in a computing environment. Embodiments of the invention can also be adapted to backup other types of data including, but not limited to, databases, servers, applications, clients, or the like or combination thereof in virtual and/or non-virtualized environments.

Embodiments of the invention provide a mechanism that can reduce the computing resources and/or bandwidth required to perform a backup operation. The backup operation may be an event driven backup operation that may be controlled or driven by a policy of a backup system. The policy may include one or more events. The data (e.g., a virtual machine including virtual disks and/or configuration data) to be backed up can be evaluated in the context of the events. When the criteria of the events is met with respect to a backup target (e.g., a virtual machine), then the backup target is backed up.

One benefit of an event driven backup operation is that a virtual machine or other data that does not meet the criteria of an event can be skipped or omitted from the backup operation. The policy of an event driven backup approach may specify or identify events that can determine when virtual machines or other data is backed up and/or when the virtual machines or other data is skipped during a backup operation.

More generally, backup operations may be driven through policies and the policies can accommodate or be associated with events. A backup system may include multiple policies. In the context of backing up virtual machines, the events identify or specify criteria that can determine whether a particular virtual machine should be backed up. For example, the event may specify that virtual machines that have not changed since the most recent backup or virtual machines whose changes have not passed a threshold (e.g., a percentage of blocks changes or a change rate) may be skipped even if other virtual machines are backed up. The ability to skip certain virtual machines during a backup operation can reduce bandwidth requirements and conserve computing resources. For instance, in a data center that includes 1000 virtual machines, it consumes more resources to backup up all of the virtual machines compared to only backing up the virtual machines that have sufficiently changed since the last backup operation or since a prior point in time.

An example of a component responsible for the backup of data such as virtual machines is a virtual backup appliance. The virtual backup appliance may also be referred to as a virtual backup appliance (VBA) node or a virtual data protection node and may include hardware and/or software. The virtual backup appliance may be responsible for communication with a backup server. The virtual backup appliance may also coordinate with proxy nodes that may be configured to actually perform the backup of a virtual machine. Advantageously, the backup operation can be diverted from production nodes to proxy nodes to ensure that critical operations are not affected by the backup operation. Multiple proxy nodes can be managed by a VBA node and a backup system may include multiple VBA nodes. In other words, a computing environment may include multiple VBA nodes and multiple proxy nodes.

In addition, the VBA nodes and the proxy nodes can perform load-balancing and multi-streaming during the backup operation. This allows multiple virtual machines to be backed up at the same time by multiple proxy nodes using multiple streams. In one example, a proxy node may backup one virtual machine at a time. When one virtual machine has been backed up by a proxy node, the proxy node may be directed to backup another virtual machine. In addition, the virtual machines being protected may by dynamically mounted to the proxy nodes such that data of the virtual machines is not physically moved across the network. Embodiments also contemplate a proxy node that can backup multiple virtual machines at the same time.

In one example, the backup operation is further enhanced with a change block tracking (CBT) mechanism or by performing change block tracking. The change block mechanism may be run on or called by either the VBA node or the proxy node in one example. The CBT mechanism can be used to determine whether a virtual machine should be backed up by determining a change rate or other indicator of the virtual machine. The CBT mechanism can also be used to identify which blocks of the virtual machine should be backed up or included in the backup. Change block tracking allows the backup operation to identify changes (e.g., identify the specific blocks that have changed since the last backup operation) in the virtual machines. Only blocks that have changed need be protected or backed up during any specific backup operation unless, for example, this is the first or initial backup operation. This can reduce the size of the backup while still allowing point in time restore operations. Both full image-level and file-level recovery can be enabled. Thus, change block tracking allows a backup operation to only backup the data or the virtual machine data that has changed since the previous backup.

Embodiments of the invention can drive the backup operation based on events that account for change rates of virtual machines that are being backed up. When the change rate is low enough, a virtual machine may be skipped during the backup operation. In other words, criteria of the event may specify that the virtual machine should be skipped if the change rate is below a predetermined threshold. The predetermined threshold may be user defined. An event driven backup operation can converse bandwidth and computing resources by skipping virtual machines or by omitting certain virtual machines from the backup operation. The virtual machines (or other data) skipped or omitted from a present backup operation may be included in the next or in another backup operation. For example, the virtual machines skipped or omitted are included in the next backup operation in which the change rate is greater than the threshold.

The events can be monitored or evaluated such that when an appropriate event is detected, the backup operation may be started. In one example, the backup server (or component running on the backup server) may actively probe the VBA nodes according to the policy such that the events that can be detected. This allows a backup operation to be initiated as soon as a virtual machine satisfies the event. For example, when a change rate of a virtual machine exceeds a change rate specified in an event, the backup operation may be initiated at least for that virtual machine.

An event driven backup operation that leverages change block tracking is provided. During a backup operation, virtual machines can be skipped or backed up based the criteria of an event. The events can be tied to a change rate of a virtual machine and evaluated in light of the change block tracking information. The events can also be tied to other changes or characteristics or data measurements of the virtual machine.

FIG. 1 illustrates an example of a computing environment that includes an example of an event driven backup system. FIG. 1 illustrates a computing environment 100 that may include computing devices 102. The devices 102 may include hardware and/or software and may be arranged in a network configuration. The devices 102 may include computing or production nodes, illustrated as nodes 106 and 110. Each node may be a computing device such as a computer, a laptop, or other device. Each device may include or have access to at least one processor, memory, and other hardware components (drivers, adapters, asics, etc.) that allow the devices 102 to operate in the computing environment 100.

The node 106 hosts a virtual machine 108 and the node 110 hosts a virtual machine 112. Each of the nodes 106 and 110 can host or support more than one virtual machine. A hypervisor layer may be running on each node 106 and 110 and the virtual machines 108 and 112 may be running on the hypervisor layer.

The computing environment 100 may also include a virtual backup appliance 104, which is an example of a virtual appliance and which may be implemented as a virtual machine. The virtual backup appliance 104 may be running on a node as well or may be a computing device. In one example, the virtual backup appliance 104 may be running on one of the nodes 106 or 110. The virtual backup appliance 104 may be configured to manage the backup of the virtual machines 108 and 112 in the computing environment 102.

The virtual backup appliance 104 may cooperate with a backup server 114 and a proxy node 122 (which may be internal to the virtual backup appliance 104 in one example) to generate and store backups of the virtual machines 108 and/or 112 in a storage 118. The virtual backup appliance 104 can manage multiple proxy nodes that are internal to the virtual backup appliance 104 and/or proxy nodes that are external. The virtual backup appliance 104 (or the proxy node 122) may also be responsible for change block tracking in the virtual machines 108 and 110. The change block tracking mechanism could also be instantiated on the nodes. The virtual backup appliance 104 can track changes to blocks in the virtual machines 108 and 112 or more specifically to the virtual disks of the virtual machines 108 and 112. A change block tracking mechanism or module may be running on the virtual backup appliance 104 or on the proxy node 122. The change block tracking performed in the computing environment 100 for each virtual machine can be used to determine a change rate for each virtual machine.

The server 114 may be associated with or maintain a policy 116 that may define or include events 120. The server 114 may include or be associated with multiple policies. The policy 116 may be associated with certain virtual machines. A list of the virtual machines associated with policy 116 may be maintained by the backup server or by another node or server. When a backup operation is performed, the policy 116 may drive the backup operation. The backup system (e.g., the backup server 114 and/or the virtual backup appliance 104) may evaluate the virtual machines 108 and 112 based on the events 120. The outcome of the evaluation may result in a backup operation that backs up some of the virtual machines in the computing environment 100 and that skips some of the virtual machines in the computing environment 100. The decision to backup or skip a particular virtual machine during a backup operation can depend on whether the particular virtual machine meets or satisfies events 120 that have been defined in the policy 116. In at least this sense, the backup operation can be event driven.

For example, the events 120 may identify conditions that determine whether a virtual machine is backed up during a backup operation and/or that determine whether a backup operation is initiated or triggered. The events 120, by way of example, may be user-definable, set by default, or the like. When a backup operation is being performed or has been triggered in the computing environment 100, the virtual machines 108 and 112 may be targeted for backup and are examples of backup targets. The virtual machines 108 and 112 may then be evaluated according to the events 120. The events 120 may indicate that some of the virtual machines be skipped. For example, one of the events 120 may state that the virtual machine 108 is skipped if there has been no change in the virtual machine since the last backup. However, if this is the first backup operation for the virtual machine 108, the events 120 may dictate that the virtual machine 108 not be skipped.

In another example, the events 120 may indicate that a virtual machine is skipped if the change rate of the virtual machine or the amount of data associated with the virtual machine 108 that has changed since the last backup is less than a certain percentage or less than a certain threshold. The criteria of the events 120 can be expressed in terms of less than or equal to, greater than or equal to, or exactly equal to.

The events 120 may be evaluated in the context of the change rate of a virtual machine and may be based on change block tracking. Change block tracking, in one example, keeps tracks of the blocks of a virtual disk or of a virtual machine that have changed since the last backup or from another reference point. The virtual backup appliance 104 may perform change block tracking or the change block tracking may be performed by the virtual machine or by another service or module or by the proxy node 122. In one example, the number of blocks that have changed since the last backup are tracked and/or the blocks that have changed are tracked. The virtual backup appliance 104 may perform change block tracking for all virtual machines in the computing environment 102 and/or for a subset of the virtual machines. Another virtual backup appliance could be associated with another subset of virtual machines in the computing environment 100.

To determine a change rate, the number of blocks changed since the last backup operation of the virtual machine can be evaluated in the context of the total number of blocks allocated to the virtual machine. In one example, if the change rate is 5% for the virtual machine 108, this may indicate that at least 5% of the data or blocks of the virtual machine 108 have changed since the last backup. Alternatively, the change rate may specify that 5% of the virtual machine or blocks of the virtual machine are expected to change in a given time period (in this case, less than 5% of the virtual machine's data may have actually changed). In either case, the virtual machine 108 is backed up.

The change rate of a virtual machine can be determined from the change block tracking as previously indicated. For example, the change rate of the virtual machine 108 may be based on a ratio of blocks that have changed to total blocks. The change rate may be a ratio of blocks changed per unit time. This can be extrapolated to determine how much of the virtual machine will change in a given time period. The change rate may be expressed in terms of other relationships as well.

When a backup operation is performed in the computing environment 100, the virtual backup appliance 104 can coordinate the backup operation with the backup server 114. The virtual backup appliance 104 may also coordinate with the proxy node 122 and the proxy node 122 may perform the actual backup operation.

When a backup operation is initiated, the virtual backup appliance 104 may instruct the proxy node 122 to perform a backup operation. The proxy node 122 may then identify the virtual machines associated with the policy 116 that is driving the backup operation and determine whether any of the virtual machines satisfy the events 120 associated with the policy 116. For example, the proxy node 122 may use the change block tracking mechanism or module to determine whether any blocks have changed in the various virtual machines (e.g., the virtual machines 108 and 112). Once the change rates of the virtual machines have been determined, the virtual machines associated with the policy 116 are backed up or skipped based on the change rates in light of the events in one example. The proxy node 122 may back up one virtual machine at a time. The virtual backup appliance may manage multiple proxy nodes such that multiple virtual machines may be backed up at the same time.

For example, an event may specify that a virtual machine is to be backed up when its change rate is greater than 3%. If it is determined that the change rate of the virtual machine 108 is 4% and the change rate of the virtual machine 112 is 1%, the backup operation will backup the virtual machine 108 and skip the virtual machine 112 during the backup operation. During the backup operation, the change rate of the virtual machine 108 may be reset because of the backup operation. The change rate of the virtual machine 112, however, may not be changed or reset. In one example, the event may specify that a virtual machine be backed up when the time between backups exceeds a maximum allowable time period regardless of the associated change rate.

Figure 2:
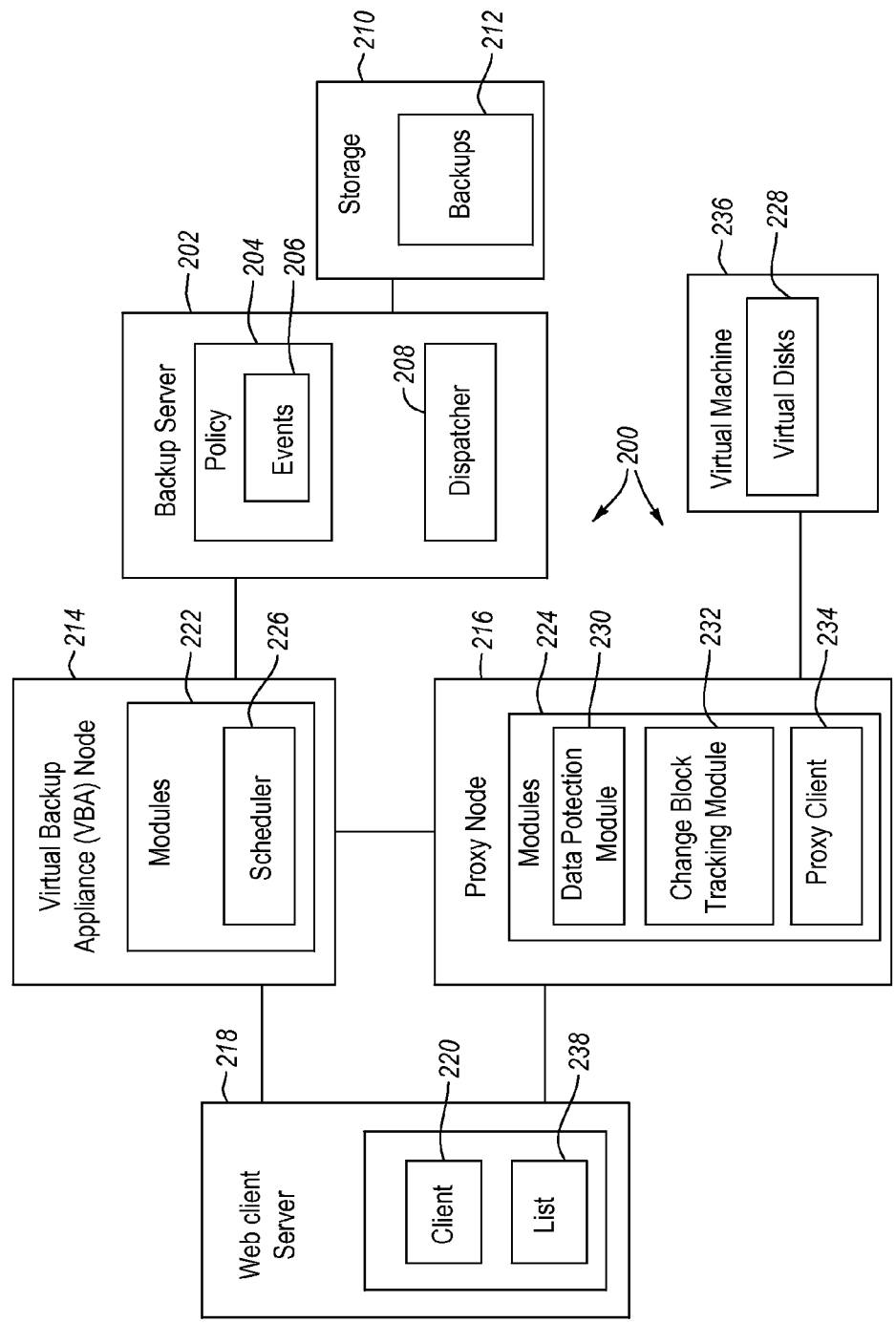
FIG. 2 illustrates and example of an event driven backup system in a computing environment.

FIG. 2 illustrates another example of a computing environment that includes a backup system and illustrates an example of a backup operation. FIG. 2 illustrates a computing environment 200. FIG. 2 illustrates an example of a backup system that can backup data including, by way of example, virtual machines.

FIG. 2 illustrates a backup server 202, which is an example of the server 114. The backup server 202 includes at least one policy, illustrated as the policy 204. Each of the policies such as the policy 204 may be associated with one or more virtual machines. The policy 204 includes or is associated with events 206 that can drive a backup operation or that are considered when performing a backup operation. When a backup operation is performed, a list of virtual machines may be obtained from the policy 204.

A backup operation of a virtual machine may be initiated by a VBA node 214, by the backup server 202, by a user, or the like. When the backup operation is initiated, the VBA node 214 may evaluate the policy 204 to determine if any of the events 206 apply to the backup operation or, more specifically, to determine which virtual machines to backup and which virtual machines to skip. The VBA node 214 can be proactive, for example, by checking to see if the events apply even if the backup operation is not initiated in another manner. For example, a dispatcher 208, which may be running on the server 202, can probe or communicate with the VBA node 214 to determine whether an event applies. When the VBA node 214 is probed or queried by the dispatcher 208, the VBA node 214 may determine whether any of the virtual machines satisfy the criteria set forth in the events 206. The VBA node 214 may be associated with a specific set of virtual machines. As a result, the query operation can be quickly determined. The dispatcher 208 may query multiple VBA nodes, each of which is associated with its own set of virtual machines. Alternatively, the computing environment may include one or more VBA nodes that are not limited or to specific virtual machines. If the event applies (e.g., it is determined that a change rate of a virtual machine exceeds a predetermine change rate), then a backup operation may be initiated for the virtual machine.

FIG. 2 illustrates illustrative examples of components or modules of a backup system. These components or modules of the backup system can be implemented on the same node, on different nodes, in different locations, and may provide server-type functionality, client-type functionality, or the like or combination thereof.

FIG. 2 illustrates a web client server 218. The web client server 218 may provide a client 220 (e.g., a plug-in) that may be a user interface to access the virtual backup appliance (VBA) node 214. The client 220 may help launch the virtual backup appliance running on the VBA node 214 or may be used for configuration purposes. The client 220 may also be used to perform backup and recovery operations from the web client server 218. The web client server 218 may provide a user interface, for example, than enables access to other components of the backup system 200 and that allows various aspects of backup/recovery operations to be controlled, monitored, configured, or the like.

The VBA node 214 is an example of a virtual backup appliance and may enable or provide communication between the web client server 218 and the backup server 202. The VBA node 214 may be configured through a web service user interface. The VBA node 214 may include modules 222 such as a scheduler component 226. The scheduler module 226 may be configured to schedule and assign proxy nodes during a backup operation. For example, a virtual machine designated for backup may be assigned to the proxy node 216 by the VBA node 214 or by the scheduler component 226. The VBA node 214 manages external proxy nodes such as the proxy node 216. The VBA node 214 may also include internal proxies and each internal proxy may responsible for protecting (e.g., backing up and/or restoring) at least one virtual machine.

In FIG. 2, the proxy node 216 may be managed by the VBA node 214 and the proxy node 216 is responsible for performing the backup of a virtual machine. The proxy node 216 can leverage a data protection module 230 and a change block tracking module 232. The data protection module 230 and the change block tracking module 232 may be application programming interfaces (APIs) and may be resident on another node. The proxy node 216 can be a different node from the VBA node 214 or the same node.

The proxy node 216 may also include a proxy client 234, which may correspond to one or more processes. The proxy client 234 may be responsible for generating a list of virtual machines to be backed up. The proxy client 234 may also coordinate the backup operation with the backup server 202 such that a backup can be stored in the backups 212 stored in the storage 210. In addition, the proxy client 234 may authenticate with the backup server 202, consult the policy 204 associated with the backup operation to determine various attributes such as the device associated with the backup operation and a retention time for the backup.

The data protection module 230 may contact the web client server 218 to identify a list of virtual machines from an inventory of virtual machines. This information may also be available from the backup server 202. In this example, the web client server 218 (or other server in the computing environment) may manage the virtual machines in the environment and may maintain a list of virtual machines. Once the virtual machines are identified, at least one of the virtual machines may be assigned to the proxy node 216 for the backup operation. The change block tracking module 232 may determine whether the virtual machine should be backed up based on the events 206 before the virtual machine is assigned to the proxy node 216. The determination of whether a given virtual machine can be skipped can occur before the virtual machine is assigned to the proxy node 216 or after the virtual machine is assigned to the proxy node 216. In one example, the VBA node(s) may cooperate with each other to evaluate the virtual machines in the context of the events 206. The VBA nodes may then use the proxy nodes that each manages to backup the virtual machines. In one example, the list of virtual machines may be queued and the VBA nodes may operate on the next entry in the queue. The backup operation may be completed when the queue is exhausted. As previously stated, some of the virtual machines in the queue may be skipped or omitted as disclosed herein.

The data protection module 230 may cause a snapshot of the virtual machine to be created when backing up the virtual machine. After the snapshot is created, the virtual disk 228 (or virtual disks) of the virtual machine being backed up (or the snapshot) are attached to the proxy node 216. The change block tracking module 230 then checks the blocks that have changed on the virtual disk 228. The virtual machine may be skipped based on an analysis of the change rate of the virtual machine.

The VBA node 214 also communicates with the server 202 or with the dispatcher 208. In one example, the dispatcher 208 may probe or query the VBA node 214 for criteria associated with the events 206 associated with policy 204. The policy 204 may define a schedule and the dispatcher 208 may query the VBA node 214 based on the schedule. For instance, the dispatcher 208 may probe the VBA node 214 to determine whether any of the events 206 have been satisfied or to determine whether a backup operation should be initialized.

In response to the dispatcher 208, the VBA node 214 may cause the data protection module 230 to determine whether the virtual machine associated with the proxy node 216 meets the criteria defined in the events 206. Alternatively, the VBA node 214 may determine whether the virtual machines in the inventory of virtual machines should be backed up before being associated with specific proxy nodes. The VBA node 216 may cause the change block tracking module 232 to determine if any of the blocks have changed for the virtual machine. If the criteria in the events are met, then the policy may cause the virtual machine to be backed up or skipped. In this context, backing up a virtual machine could include skipping the virtual machine.

Figure 3:
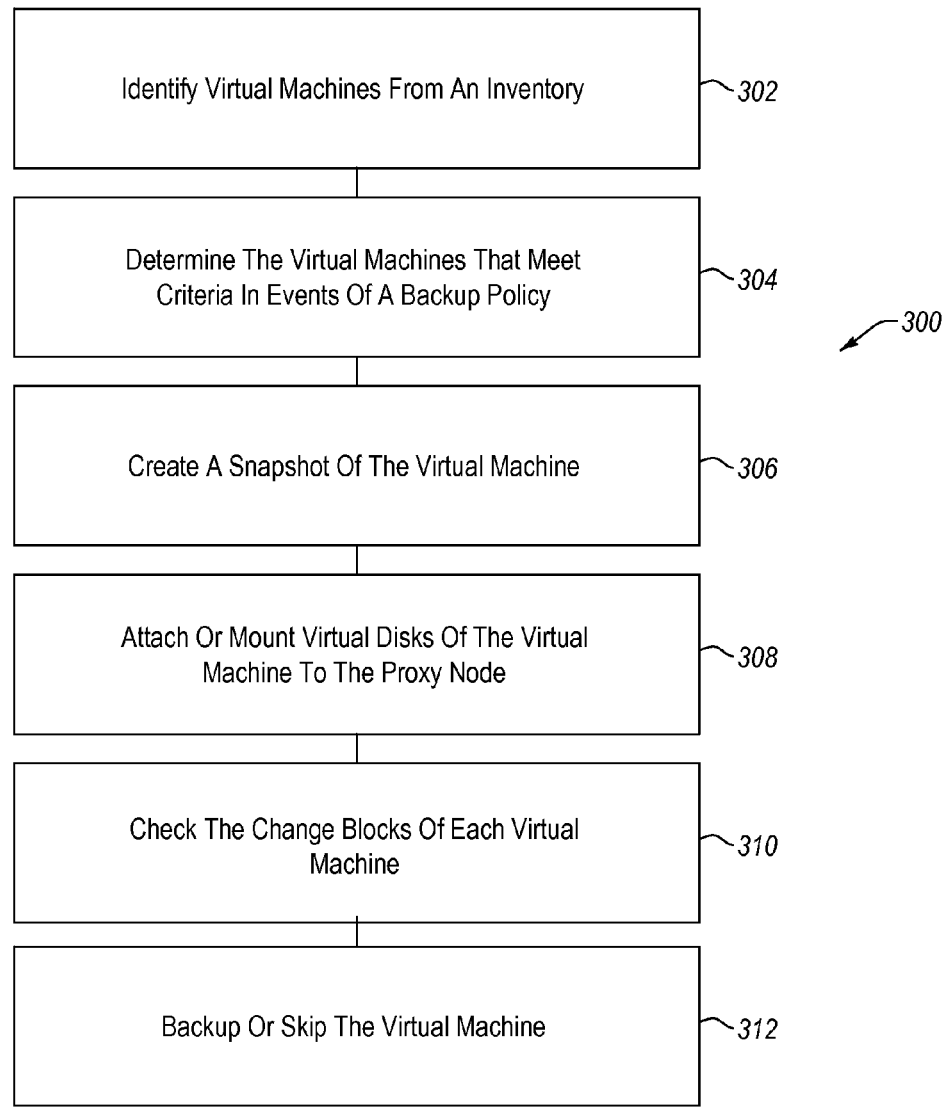
FIG. 3 illustrates an example of a method for performing a backup operation.

FIG. 3 illustrates an example of a method for performing a backup operation. When a backup operation is initiated, a list of virtual machines may be identified from an inventory in block 302. The list of virtual machines may be maintained by one or more components of the backup system. For example, the web client server 218 may maintain a list 238 of virtual machines that are associated with the backup system 200. The number of virtual machines in a computing environment can be large. A data center, for example, may have thousands of virtual machines. As previously stated, backing up a large number of virtual machines can consume significant resources. The ability to skip some of the virtual machines can improve the efficiency of the backup operation, reduce bandwidth requirements, shorten the backup window, allow more frequency backup operations, or the like or combination thereof.

In block 304, the virtual machines that meet the criteria set forth in the event or events of a policy are determined. Each event may include several criteria. For example, the first backup of a virtual machine may go forward regardless of the virtual machine's change rate. The criteria of the event may indicate that the virtual machine should be skipped when there has been no change to the data blocks of the virtual machine. The criteria may also set a certain percentage change rate. The change rate may be user defined. The criteria in the event may associate the change rate with a qualifier (e.g., equal to, less than, less than or equal to, greater than, greater than or equal to, etc.). When the virtual machine is evaluated in the context of the event, the change rate of a virtual machine of the virtual machine's virtual disks is determined and compared to the change rate set forth in the event. Depending on how the change rate of the virtual machine compares to the change rate set forth in the event, the virtual machine is either skipped or backed up. In one example, the virtual machine may be included in the backup operation when the change rate exceeds (or is equal to) the change rate of the event. If the change rate of the virtual machine is below (or equal to) the events' change rate, the virtual machine is skipped.

When it is determined that the virtual machine should be backed up, a snapshot of the virtual machine may be created in block 306. However, the blocks to be backed up could also be identified from the change rate tracking performed by the backup system. Next, the virtual disk is attached to the proxy node 308 that is responsible for performing the actual backup operation of the virtual machine. In block 310, the change block tracking mechanism or module may be used to determine which blocks have changed in each of the virtual disks attached to the proxy mode. The changed blocks are then backed up in block 312. The changed blocks may be backed up to the storage 210 in the backups 212.

This process can be performed continuously, or according to a schedule, or as needed. The VBA node may be probed periodically to determine, based on the events, whether a virtual machine should be backed up. Whenever the criteria of the event is satisfied, the relevant virtual machines are backed up by a backup operation and the other virtual machines may be skipped.

Figure 4:
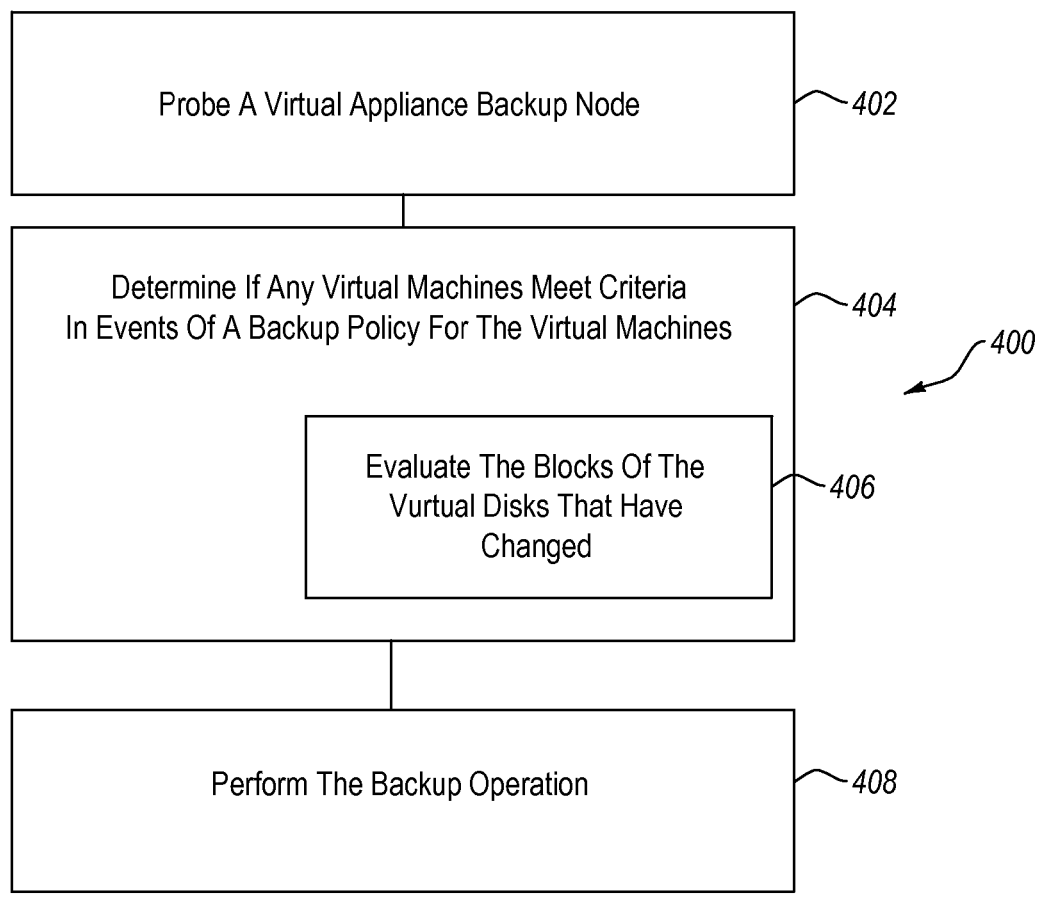
FIG. 4 illustrates another example of a method for performing a backup operation in a computing environment that includes virtual machines.

FIG. 4 illustrates another example of a method for performing a backup operation. The backup operation can be initiated in various ways as previously stated. FIG. 4 illustrates that a backup operation may be initiated when a VBA node is probed by a backup server (e.g., by the dispatcher 208) in block 402. The VBA node is probed based on the server's policy and associated events. In response to the probe, the VBA mode may evaluate the change rate of at least some of the virtual machines (e.g., the virtual machines being managed or associated with the VBA node). The result of the probe can determine whether any virtual machines should be backed up.

Thus, in block 404, the VBA node and/or the proxy node determines whether any of the virtual machines meet the criteria in the events. This may include checking the changed blocks in each virtual machine or determining a change rate for each virtual disk of each or of selected virtual machines. The change rate for a virtual machine that includes multiple virtual disks may be averaged. Alternatively, if one virtual disk requires backup, all virtual disks of the virtual machine are backed up. Is also possible to backup specific virtual disks of a particular virtual machine.

When a virtual machine is identified that satisfies the criteria of the events, a backup operation is performed for the identified virtual machine in block 408. When a virtual machine is backed up, the virtual disks may be mounted or attached to the proxy node and the proxy node may coordinate directly with the backup server to backup the changed blocks of the virtual machine.

When the backup is completed, or after the snapshot has been performed, the change rate used to determine whether a virtual machine should be backed up may be reset such that the next time a backup operation should be performed can be determined.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for backing up a virtual machine in a computing environment that includes one or more processors, memory and other hardware components, the method comprising:
   determining whether a virtual machine satisfies criteria defined in an event of a policy by a virtual backup appliance node, wherein determining whether a virtual machine satisfies criteria defined in an event of a policy includes determining a change rate of a virtual disk based on blocks that have changed in the virtual machine,
   wherein the blocks that have changes are tracked by a change block tracking mechanism, wherein determining the change rate of the virtual disk includes evaluating a number of blocks of the virtual disk that have changed since a previous backup operation for the virtual machine based on the change block tracking mechanism that tracks blocks in the virtual disk that have changed since the previous backup operation,
   wherein the change rate indicates how many blocks of the virtual machine have changed and how many of the blocks are expected to change in a given time period;
   causing the virtual machine to be attached to a proxy node by the virtual backup appliance node; and
   backing up the virtual machine by the proxy node.

2. The method of claim 1, wherein determining whether a virtual machine satisfies criteria defined in an event of a policy further comprises identifying a list of virtual machines in the computing environment.

3. The method of claim 1, wherein backing up the virtual machine includes backing up the changes identified by the change block tracking mechanism.

4. The method of claim 1, wherein backing up the virtual machine includes skipping the virtual machine when the criteria in the event is not satisfied.

5. The method of claim 1, wherein attaching the virtual machine to a proxy node includes mounting a virtual disk of the virtual machine to the proxy node.

6. A method for performing a backup operation in a computing environment that includes one or more processors, memory and other hardware components, that includes a plurality of virtual machines, the method comprising:
   probing a virtual backup appliance by a dispatcher of a backup server in accordance with an event of a policy, wherein the event of the policy is used to determine whether a virtual machine should be backed up during or omitted from the backup operation;
   determining whether the virtual machine meets the event of the policy by the virtual backup appliance by comparing a change rate of the virtual machine to a control change rate included in the event of the policy, where the virtual machine is backed up when the change rate satisfies the control change rate,
   wherein determining whether the virtual machine meets the event of the policy further comprises determining a change rate of the virtual machine, wherein the change rate indicates how many blocks of the virtual machine have changed and how many of the blocks are expected to change in a given time period;
   performing the backup operation on the virtual machine by a proxy node when the change rate satisfies the control change rate and skipping the virtual machine from the backup operation when the change rate does not satisfy the control change rate; and
   performing a snapshot of the virtual machine by the virtual backup appliance when the virtual machine is included in the backup operation and prior to backing up the virtual machine.

7. The method of claim 6, wherein a change block tracking mechanism identifies which blocks of the virtual machine have changes, wherein the changed blocks are backed up in the backup operation when the virtual machine is included in the backup operation.

8. The method of claim 6, wherein the change rate satisfies the control change rate when the change rate is greater than the control change rate or greater than or equal to the control change rate set forth in the event.

9. The method of claim 6, further comprising backing up multiple virtual machines that satisfy the criteria of the event simultaneously with one or more proxy nodes.

10. The method of claim 6, further comprising resetting the change rate of the virtual machine after performing the backup operation.

11. A backup system that is configured to perform a backup operation and that includes one or more processors, memory, and hardware components, the backup system including:
   a virtual backup appliance node that is configured to manage a plurality of proxy nodes, wherein the virtual backup appliance node tracks changes to blocks of at least one virtual machine with a change block tracking mechanism; and
   a backup server configured to coordinate with the plurality of proxy nodes to store a plurality of backups generated by the plurality of proxy nodes during the backup operation, wherein the backup server includes a policy that includes at least one event,
   the backup server includes a dispatcher configured to probe the virtual backup appliance node based on the policy, wherein the virtual backup appliance node evaluates the at least one virtual machine to determine whether the at least one virtual machine meets criteria in the at least one event, wherein the criteria includes a change rate indicating how many blocks of the at least one virtual machine have changed and how many of the blocks are expected to change in a given time period,
   wherein the virtual backup appliance node identifies virtual machines to include in the backup operation and virtual machines to omit from the backup operation based on the at least one event,
   wherein the virtual backup appliance node causes a snapshot of the virtual machine being backed up to be performed, wherein a backup is made of blocks that have changed since the last backup operation based on changed blocks identified by the change block tracking mechanism, and
   wherein the proxy nodes perform the backup operation to backup the virtual machines included in the backup operation to a storage device associated with the backup server.

12. The backup system of claim 11, further comprising a web client server, wherein the web client server is configured to maintain a list of the at least one virtual machine.

13. The backup system of claim 11, wherein the at least one event includes a control change rate, wherein the virtual backup appliance determines a change rate for each of the at least one virtual machine, wherein the virtual machines whose change rate is at least equal to or greater than the control change rate are included in the backup operation, wherein the virtual machines whose change rate is less than the control change rate are omitted from the backup operation.

\* \* \* \* \*